(12) United States Patent
Sugie et al.

(10) Patent No.: US 10,328,889 B2
(45) Date of Patent: Jun. 25, 2019

(54) VEHICLE OCCUPANT PROTECTION DEVICE

(71) Applicant: TOYOTA JIDOSHA KABUSHIKI KAISHA, Toyota-shi, Aichi-ken (JP)

(72) Inventors: Kazuki Sugie, Miyoshi (JP); Masanobu Ohmi, Kasugai (JP); Seiji Yamamoto, Seto (JP); Yoshiaki Matsumura, Toyota (JP); Kosuke Sakakibara, Toyota (JP); Misato Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 15/473,005

(22) Filed: Mar. 29, 2017

(65) Prior Publication Data

US 2017/0291569 A1 Oct. 12, 2017

(30) Foreign Application Priority Data

Apr. 6, 2016 (JP) .................. 2016-076762

(51) Int. Cl.
*B60R 21/207* (2006.01)
*B60R 21/2338* (2011.01)
(Continued)

(52) U.S. Cl.
CPC ...... *B60R 21/233* (2013.01); *B60R 21/01552* (2014.10); *B60R 21/2338* (2013.01);
(Continued)

(58) Field of Classification Search
CPC .... B60R 2021/0048; B60R 2021/2074; B60R 21/2338; B60R 21/233
See application file for complete search history.

(56) References Cited

U.S. PATENT DOCUMENTS 3,753,576 A * 8/1973 Gorman ................ B60R 21/207
280/730.1
3,953,049 A * 4/1976 Surace .................... B60R 21/08
280/730.1
(Continued)

FOREIGN PATENT DOCUMENTS

DE 9405366 U1 * 6/1994 ............... B60N 2/26
DE 19834061 A1 * 2/2000 ........... B60R 21/207
(Continued)

*Primary Examiner* — Nicole T Verley
(74) *Attorney, Agent, or Firm* — Oliff PLC

(57) ABSTRACT

A vehicle occupant protection device has an airbag main body that is formed as a single integrated bag body that covers a head portion of a vehicle occupant and includes a forward-inflating portion housed in a headrest or in a seat back of a vehicle seat, and which inflates and deploys when supplied with gas, and which inflates on a seat front side of the head portion, and a pair of left and right side-inflating portions which inflate on seat side portions of the head portion. This vehicle occupant protection device also has a sub-bag portion that is provided in at least one of the forward-inflating portion and the side-inflating portions, and that, when an internal pressure inside the airbag main body reaches a predetermined value or greater, inflates after receiving an inflow of gas from at least one of the forward-inflating portion and the side-inflating portions.

19 Claims, 10 Drawing Sheets

(51) Int. Cl.
  *B60R 21/233* (2006.01)
  *B60R 21/015* (2006.01)
  *B60R 21/00* (2006.01)

(52) U.S. Cl.
  CPC ............ *B60R 2021/0048* (2013.01); *B60R 2021/2074* (2013.01); *B60R 2021/23308* (2013.01)

(56) References Cited

U.S. PATENT DOCUMENTS

| | | | |
|---|---|---|---|
| 6,315,245 B1 * | 11/2001 | Ruff | B64D 25/02 244/122 AG |
| 8,128,124 B2 * | 3/2012 | Abe | B60R 21/233 280/731 |
| 8,181,988 B2 * | 5/2012 | Adachi | B60R 21/233 280/729 |
| 8,579,321 B2 * | 11/2013 | Lee | B60R 21/214 280/729 |
| 9,573,553 B2 * | 2/2017 | Ko | B60R 21/233 |
| 9,669,789 B2 * | 6/2017 | Fujiwara | B60R 21/0136 |
| 9,676,355 B2 * | 6/2017 | Kruse | B60R 21/0136 |
| 9,796,351 B2 * | 10/2017 | Fujiwara | B60R 21/207 |
| 9,950,687 B2 * | 4/2018 | Kato | B60R 21/207 |
| 10,005,417 B2 * | 6/2018 | Ohno | B60R 21/207 |
| 2006/0192370 A1 * | 8/2006 | Abe | B60R 21/0132 280/735 |
| 2006/0196715 A1 * | 9/2006 | Fujishiro | B60N 2/0276 180/271 |
| 2011/0278826 A1 * | 11/2011 | Fukawatase | B60R 21/231 280/730.2 |
| 2013/0015642 A1 * | 1/2013 | Islam | B60R 21/207 280/730.1 |
| 2013/0154245 A1 | 6/2013 | Fukawatase et al. | |
| 2015/0091278 A1 * | 4/2015 | Yasuoka | B60R 21/2334 280/729 |
| 2016/0347272 A1 | 12/2016 | Kato et al. | |

FOREIGN PATENT DOCUMENTS

| | | | | |
|---|---|---|---|---|
| EP | 1632407 A2 * | 3/2006 | ........... | B60R 21/214 |
| JP | 2000-344044 A | 12/2000 | | |
| JP | 2007-230396 A | 9/2007 | | |
| JP | 2013-018378 A | 1/2013 | | |
| JP | 2013-124029 A | 6/2013 | | |
| JP | 2016-222072 A | 12/2016 | | |
| JP | 2017-30638 A | 2/2017 | | |
| WO | 2010/050015 A1 | 5/2010 | | |
| WO | 2016-174785 A1 | 11/2016 | | |

\* cited by examiner

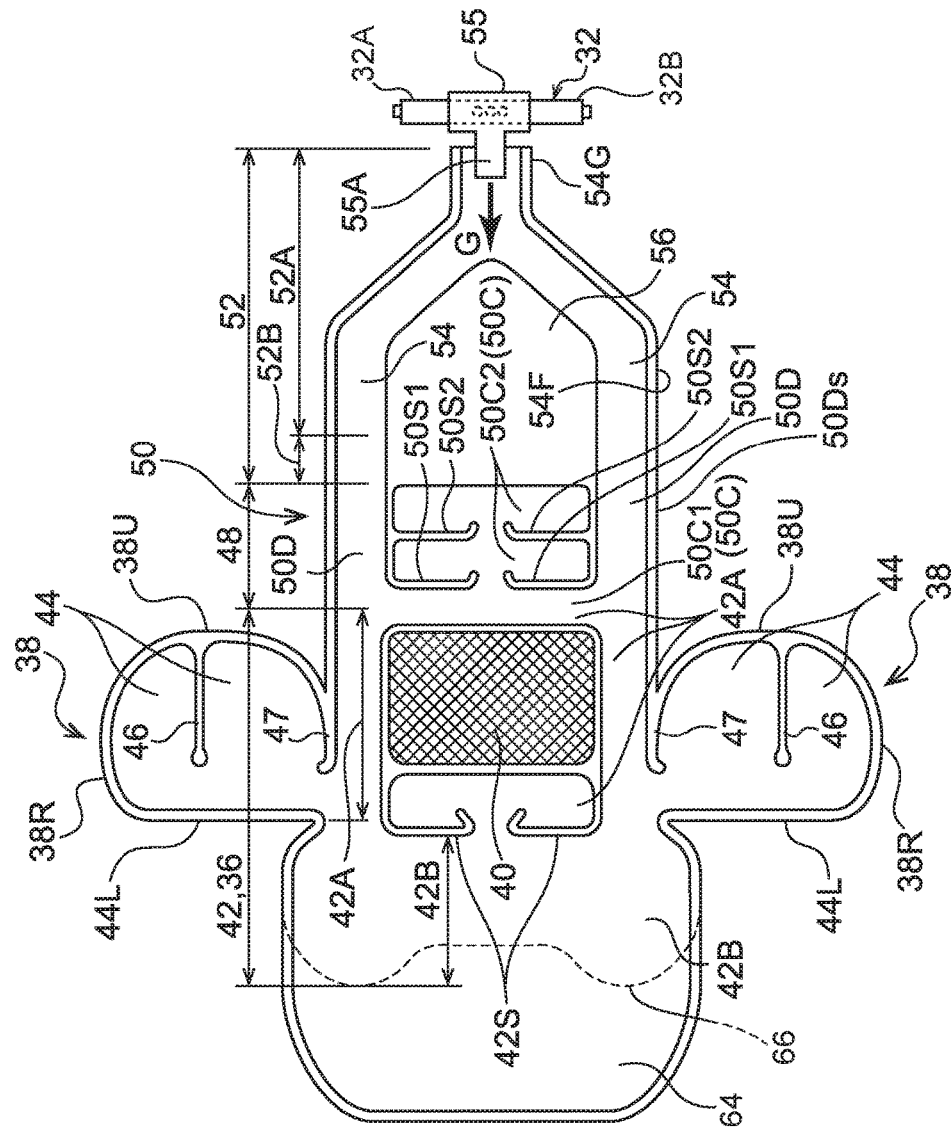

VEHICLE OCCUPANT PROTECTION DEVICE

CROSS-REFERENCE TO RELATED APPLICATION

This application is based on and claims priority under 35 USC 119 from Japanese Patent Application No. 2016-076762 filed on Apr. 6, 2016, the disclosure of which is incorporated by reference herein.

BACKGROUND

Technical Field

The present disclosure relates to a vehicle occupant protection device.

Related Art

An airbag device is disclosed in Japanese Patent Application Laid-Open (JP-A) No. 2000-344044 (Patent document 1) in which, during a collision, gas from an inflator is supplied through a gas supply pipe that is fixed to a seat back to a bag that is attached to this gas supply pipe, and as a result, this bag is inflated so as to cover the front and side of a vehicle occupant. In addition, an airbag device is disclosed in Japanese Patent Application Laid-Open (JP-A) No. 2013-018378 (Patent document 2) in which a pair of airbags are inflated towards the front from left and right end portions of a headrest and join together at a front surface of the head portion of a vehicle occupant, while at the same time an auxiliary airbag inflates towards the front from a central portion of the seat headrest and is joined to the pair of airbags. Furthermore, a structure is disclosed in US Patent Publication No. 2013/0015642 (Patent document 3) in which a hood is housed inside a cover that is provided in an upper portion of a seat back, and when gas is supplied thereto from an inflator, the hood is deployed so as to cover the upper body of a vehicle occupant.

In the structure described in Patent document 1, because the gas supply pipe is provided on top of the seat back, this structure has an unattractive appearance. In the same way, in the structure described in Patent document 3, because the inflator and cover are exposed, this structure also has an unattractive appearance. In contrast, in the structure described in Patent document 2, it is difficult to ensure the join strength between the pair of head portion airbags that are joined to each other after being inflated and deployed, and to ensure the join strength between the pair of head portion airbags and the head portion auxiliary airbag.

As a measure to counter these drawbacks, consideration may be given to employing a structure in which an airbag is housed in the headrest and seat back of a vehicle seat, and this airbag is inflated and deployed so as to cover the head portion of a vehicle occupant from the seat front side and from both the left and right sides. Here, in order to swiftly restrain a vehicle occupant, it is necessary for the inflation and deployment of an airbag to be completed at an early stage. On the other hand, the higher the internal pressure of the airbag, the greater the reaction force acting on the vehicle occupant when the vehicle occupant is restrained.

SUMMARY

The present embodiments were conceived in view of the above-described circumstances and it is an object thereof to provide a vehicle occupant protection device that, in a structure in which an airbag is housed in a headrest or seat back, enables the airbag to be deployed rapidly while maintaining excellent internal pressure inside the airbag.

A vehicle occupant protection device according to a first aspect includes an airbag main body that is formed as a single integrated bag body covering a head portion of a vehicle occupant and that includes a forward-inflating portion, which is housed in a headrest or in a seat back of a vehicle seat, which inflates and deploys when supplied with gas from a gas-generating portion, and which inflates on a seat front side of the head portion, the airbag main body including a pair of left and right side-inflating portions that are connected to the forward-inflating portion and that inflate on seat side portions of the head portion, and a sub-bag portion that is provided in at least one of the forward-inflating portion the left side-inflating portion or the right side-inflating portion, and that, when an internal pressure inside the airbag main body reaches a predetermined value or greater, inflates after receiving an inflow of gas from the at least one of the forward-inflating portion, the left side-inflating portion or the right side-inflating portion.

In the vehicle occupant protection device according to the first aspect, an airbag is housed in a headrest or seat back of a vehicle seat. This airbag is supplied with gas from a gas-generating portion and is inflated and deployed from the headrest or seat back. Moreover, because the airbag is formed as a single integrated bag body that includes a forward-inflating portion and a left and right pair of side-inflating portions and covers the head portion of a vehicle occupant, movement of the head portion of the vehicle occupant is limited (i.e., the head portion of the vehicle occupant is restrained) by the airbag in a variety of different types of collision, so that the vehicle occupant is protected.

Moreover, a sub-bag portion is provided in at least one of the forward-inflating portion and the side-inflating portions. In this structure, when the internal pressure inside the airbag main body reaches a predetermined value or greater, gas flows in from at least one of the forward-inflating portion and the side-inflating portions and inflates the sub-bag portion. As a consequence, for example, even if a large quantity of gas flows in in order to cause the airbag to rapidly inflate and deploy, when the internal pressure inside the airbag main body reaches a predetermined level or greater, gas flows from the airbag main body into the sub-bag portion so that the internal pressure inside the airbag main body does not become too high. Namely, the internal pressure inside the airbag main body can be maintained at the proper level.

A vehicle occupant protection device according to a second aspect is characterized in that, in the first aspect, a tear seam that ruptures when the internal pressure inside the airbag main body reaches a predetermined value or greater, is sewn in a boundary between the airbag main body and the sub-bag portion.

In the vehicle occupant protection device according to the second aspect, when the internal pressure inside the airbag main body reaches a predetermined value or greater, the tear seam ruptures and gas flows from at least one of the forward-inflating portion and the side-inflating portions into the sub-bag portion. As a consequence, the internal pressure inside the airbag main body does not become too high, and the internal pressure inside the airbag main body can be maintained at the proper level.

A vehicle occupant protection device according to a third aspect is characterized in that, in the first or second aspects, the sub-bag portion is provided in a lower portion of the at least one of the forward-inflating portion, the left side-inflating portion or the right side-inflating portion such that it is able to inflate and deploy on a seat lower side, and when a height of the head portion of the vehicle occupant, as detected by a vehicle occupant detection sensor, is lower than a predetermined height, a greater quantity of gas is supplied from the gas-generating portion to the airbag main body than when the height of the head portion is higher than a predetermined height.

In the vehicle occupant protection device according to the third aspect, when the height of the head portion of a vehicle occupant sitting in the vehicle seat is low, then a greater quantity of gas is supplied from the gas-generating portion to the airbag main body than when a vehicle occupant having a high sitting height is seated. As a consequence, when a vehicle occupant of small stature whose sitting height is low is sitting in the vehicle seat, the sub-bag portion is proactively inflated and deployed towards the seat lower side, and the range of the restraint of the vehicle occupant by the airbag is expanded towards the seat lower side. As a result, even if the vehicle occupant is small in stature, the head portion of that vehicle occupant can be properly restrained.

A vehicle occupant protection device according to a fourth aspect is characterized in that, in the third aspect, a plural gas-generating portions are provided, when the height of the head portion as detected by the vehicle occupant detection sensor is higher than a predetermined height, then gas is supplied from a portion of the plurality of gas-generating portions to the airbag main body, and when the height of the head portion as detected by the vehicle occupant detection sensor is lower than a predetermined height, then gas is supplied from all of the plurality of gas-generating portions to the airbag main body.

In the vehicle occupant protection device according to the fourth aspect, when a vehicle occupant of small stature whose sitting height is low is sitting in the vehicle seat, gas is supplied from all of the plurality of gas-generating portions to the airbag main body, so that the sub-bag portion can be inflated and deployed swiftly.

A vehicle occupant protection device according to a fifth aspect is characterized in that, in the third or fourth aspects, the sub-bag portion is provided in a lower portion of the forward-inflating portion, the vehicle occupant protection device further including a strap that has one end fixed to the headrest, to the seat back, or further to the seat rear side of the airbag main body than the forward-inflating portion, that has another end fixed to the sub-bag portion, and that pulls the sub-bag portion towards the seat rear side in conjunction with the inflation and deployment of the sub-bag portion towards the seat lower side.

In the vehicle occupant protection device according to the fifth aspect, when the sub-bag portion is in an inflated and deployed state, tensile force towards the seat rear side is made to act on the sub-bag portion by the strap. As a consequence, even if a vehicle occupant makes an inertial movement towards the seat front side because of a vehicle collision or the like, the upper body of the vehicle occupant can be properly restrained by the sub-bag portion.

A vehicle occupant protection device according to a sixth aspect is characterized in that, in the fifth aspect, a pair of left and right straps are provided, and the other end of each strap is individually fixed to one of two end portions in a seat transverse direction of the sub-bag portion.

In the vehicle occupant protection device according to the sixth aspect, both end portions in the seat transverse direction of the sub-bag portion are pulled towards the seat rear side by the pair of left and right straps. As a consequence, compared, for example, with a structure in which the strap is fixed only to an intermediate portion in the seat transverse direction of the sub-bag portion, it is possible to improve the ability of the sub-bag portion to restrain the vehicle occupant.

A vehicle occupant protection device according to a seventh aspect is characterized in that, in the fifth or sixth aspects, the other end of the strap is fixed to a lower portion of the sub-bag portion.

In the vehicle occupant protection device according to the seventh aspect, it is possible to restrain the lower portion of the sub-bag from sliding towards the seat front side when it comes into contact with a vehicle occupant.

A vehicle occupant protection device according to an eighth aspect is characterized in that, in any one of the fifth through seventh aspects, the one end of the strap is fixed to the headrest or to the seat back.

In the vehicle occupant protection device according to the eighth aspect, because there is no change in the position of the one end strap before and after the inflation and deployment of the airbag, the sub-bag portion can be pulled stably towards the seat rear side.

A vehicle occupant protection device according to a ninth aspect is characterized in that, in any one of the fifth through seventh aspects, the one end of the strap is fixed to a position on the seat upper side of the other end of the strap.

In the vehicle occupant protection device according to the ninth aspect, the sub-bag portion is pulled by the strap diagonally towards the seat rear side and the seat upper side. As a consequence, the upper body of a vehicle occupant who has tilted forwards due to a collision can be supported from the seat lower side.

A vehicle occupant protection device according to a tenth aspect is characterized in that, in the ninth aspect, a portion between the one end and the other end of the strap is fixed to the side-inflating portions.

In the vehicle occupant protection device according to the tenth aspect, by fixing an intermediate portion between the one end and the other end of the strap to the side-inflating portions, it is difficult for the strap to be entangled during the inflation and deployment of the airbag main body, so that the strap can be deployed smoothly.

As has been described above, according to the vehicle occupant protection device according to the first aspect, in a structure in which an airbag is housed in a headrest or a seat back, the excellent effect is achieved that the airbag can be deployed swiftly at the same time as the internal pressure inside the airbag is maintained at an excellent level.

According to the vehicle occupant protection device according to the second aspect, the excellent effect is achieved that the internal pressure inside the airbag main body can be restricted from becoming too high by means of a simple structure.

According to the vehicle occupant protection device according to the third aspect, the excellent effect is achieved that a superior restraining performance can be maintained even for a vehicle occupant of small stature who has a low sitting height.

According to the vehicle occupant protection device according to the fourth aspect, the excellent effect is achieved that it is possible to improve the protection performance for a vehicle occupant who has a low sitting height by means of a simple structure.

According to the vehicle occupant protection device according to the fifth aspect, the excellent effect is achieved that it is possible to improve the restraining performance for a vehicle occupant by the sub-bag portion.

According to the vehicle occupant protection device according to the sixth aspect, the excellent effect is achieved that it is possible to improve the restraining performance of a vehicle occupant compared to a structure in which only one strap is provided.

According to the vehicle occupant protection device according to the seventh aspect, the excellent effect is achieved that it is possible to improve the restraining performance of a vehicle occupant compared to a structure in which the other end of the strap is fixed to an upper portion of the sub-bag portion.

According to the vehicle occupant protection device according to the eighth aspect, the excellent effect is achieved that it is possible to maintain a superior protection performance for a vehicle occupant compared to a structure in which the one end of the strap is fixed to the airbag.

According to the vehicle occupant protection device according to the ninth aspect, the excellent effect is achieved that it is possible to effectively restrain a vehicle occupant who has tilted forwards due to a collision.

According to the vehicle occupant protection device according to the tenth aspect, the excellent effect is achieved that it is possible to improve the deployment performance compared with when a fixing point is not provided between the one end and the other end of the strap.

BRIEF DESCRIPTION OF THE DRAWINGS

Exemplary embodiments of the present invention will be described in detail based on the following figures, wherein:

FIG. 5 is a view showing a flat pattern of a multi-directional airbag that forms part of the vehicle occupant protection device according to the first exemplary embodiment;

DETAILED DESCRIPTION

First Exemplary Embodiment

Figure 1:
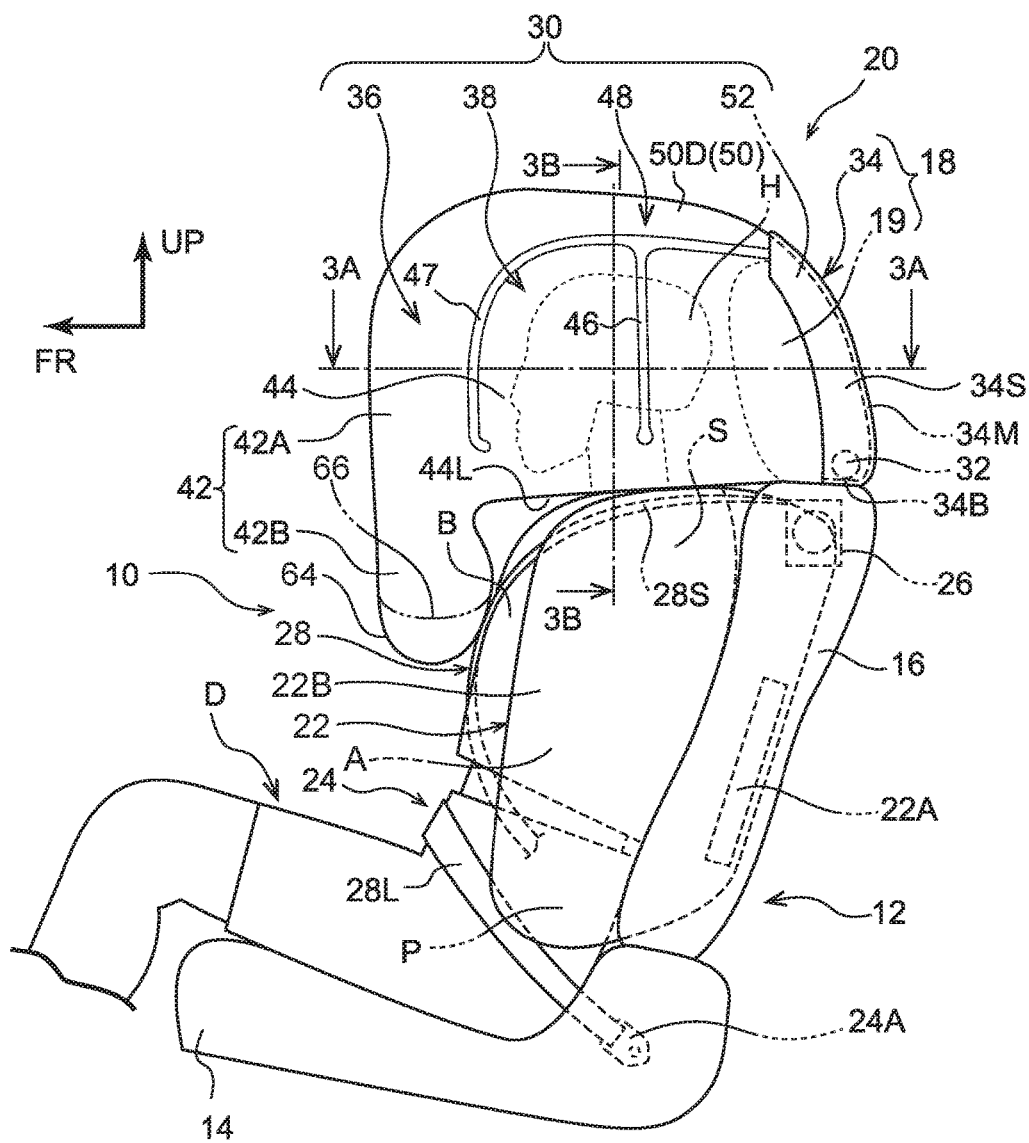
FIG. 1 is a side view schematically showing a mode of protection of a seated person provided by a vehicle occupant protection device according to a first exemplary embodiment.

A vehicle occupant protection device 10 according to a first exemplary embodiment of the present invention will now be described with reference made to the drawings. Note that an arrow FR and an arrow UP that are shown where appropriate in the drawings respectively indicate a forward direction of a vehicle seat 12 (i.e., a direction in which a seated person faces), and an upward direction. Hereinafter, unless specifically stated otherwise, if simple front-rear, up-down, or left-right directions are used, then these refer respectively to the front-rear directions of the seat, the up-down directions of the seat, and the left-right directions when facing towards the front in the seat front-rear direction. Note also that an arrow IN which is shown where appropriate in the drawings shows a vehicle center side in the vehicle transverse direction of an automobile that is serving as a vehicle in which the vehicle seat 12 has been installed.

(Overall Schematic Structure of a Vehicle Occupant Protection Device)

Figure 2:
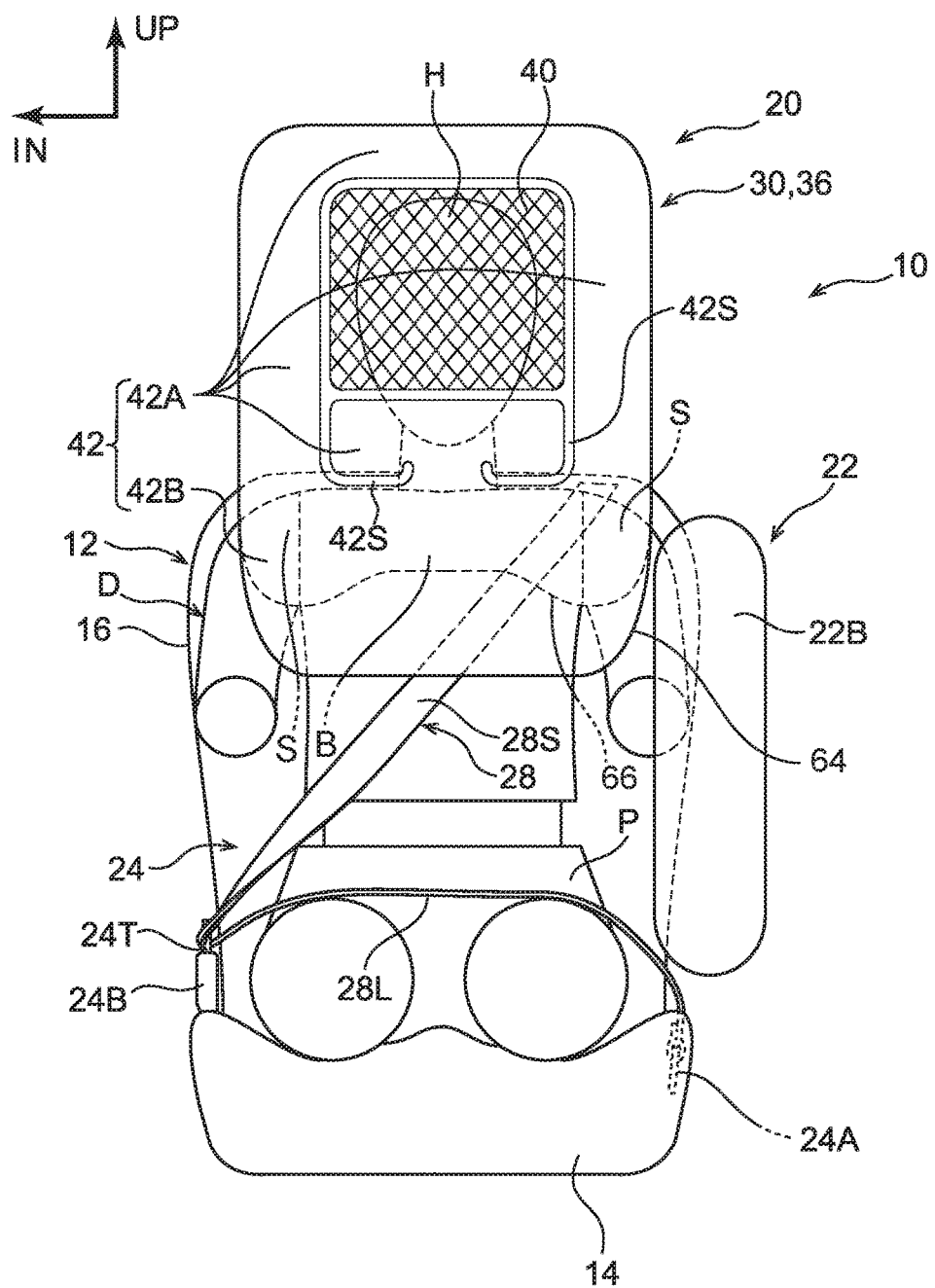
FIG. 2 is a front view schematically showing a mode of protection of a seated person provided by the vehicle occupant protection device according to the first exemplary embodiment.

As is shown in FIG. 1 and FIG. 2, the vehicle occupant protection device 10 of the present exemplary embodiment is mounted in the vehicle seat 12. The vehicle seat 12 is disposed in a position that is offset to either the left side or right side (to the left side in the present exemplary embodiment) relative to the center in the vehicle transverse direction of a vehicle body of an automobile (not shown in the drawings). In the present exemplary embodiment, the front-rear direction of the vehicle seat 12 matches the front-rear direction of a vehicle, and the seat transverse direction of the vehicle seat 12 matches the vehicle transverse direction. Moreover, the vehicle seat 12 is formed so as to include a seat cushion 14, a seat back 16 whose lower end is coupled to a rear end of the seat cushion 14, and a headrest 18 that is provided at an upper end of the seat back 16.

Note that, in each of the drawings, a state is shown in which a collision test dummy D is seated on the seat cushion 14 of the vehicle seat 12 so as to serve as a model of the vehicle occupant who is to be protected. This dummy D is, for example, a World SID (Internationally integrated side impact dummy: World Side Impact Dummy) AM50 (i.e., the 50th percentile of American adult males). This dummy D is seated in a standard sitting posture that is determined using a collision test method. The vehicle seat 12 is located in a reference set position that corresponds to the aforementioned sitting posture. Hereinafter, the dummy D will be referred to as the 'seated person D' in order to make the description easier to understand.

The vehicle occupant protection device 10 is formed so as to include a multidirectional airbag device 20 that is intended to protect the seated person D from various types of collision, a side airbag device 22, a seatbelt device 24, and an ECU (electronic control unit) 60 that serves as a control device. Hereinafter, the schematic structure of the seatbelt device 24 and the side airbag device 22 will be described, and thereafter the multidirectional airbag device 20 will be described.

The seatbelt device 24 is a three-point type of seatbelt device. One end of a belt (i.e., a webbing) 28 is retractably wound onto a retractor 26, while another end of the belt 28 is fixed to an anchor 24A. A tongue plate 24T is provided such that it is able to slide along the belt 28, and the seated person D puts on the belt 28 by engaging this tongue plate 24T with a buckle 24B. The belt 28 is formed such that, when it is being worn by the seated person D, it includes a shoulder belt 28S that extends from the retractor 26 to the tongue plate 24T and restrains the upper body of the seated person D, and a lap belt 28L that extends from the tongue plate 24T to the anchor 24A and restrains a pelvic portion P of the seated person D.

In the present exemplary embodiment, the seatbelt device 24 is formed as what is known as a 'seatbelt device with attached seat' in which the retractor 26, the anchor 24A, and the buckle 24B are provided on the vehicle seat 12. Moreover, the retractor 26 of the present exemplary embodiment is provided with a pretensioner that serves as a belt retracting mechanism that, when operated, forcibly imparts tension to the belt 28. The pretensioner is operated by the ECU 60 (described below).

The side airbag device 22 is constructed so as to include an inflator 22A and a side airbag 22B, and is housed in a side portion on the outer side in the vehicle transverse direction of the seat back 16 with the side airbag 22B in a folded state. When the inflator 22A is operated, it generates gas inside the side airbag 22B. This gas causes the side airbag 22B to protrude towards the front from the side portion of the seat back 16, and to inflate and deploy on the outer side in the vehicle transverse direction relative to the seated person D. In the present exemplary embodiment, the side airbag 22B is formed such that it is inflated and deployed on the outer side in the vehicle transverse direction of a pelvic portion P, an abdominal portion A, a breast portion B, and a shoulder portion S of the seated person D.

(Multi-directional Airbag Device Structure)

As is shown in FIG. 1, the multi-directional airbag device 20 is formed so as to include a multi-directional airbag 30, which serves as an airbag main body, and a sub-bag 64, an inflator 32, and a module case 34 that forms part of the headrest 18. The multi-directional airbag 30 is folded in such a way that the inflator 32 is connected to it and is able to supply it with gas, and is housed within the module case 34. The multi-directional airbag device 20 which has been modularized in this way is provided in the headrest 18 above the seat back 16. This will be described below in detail.

(Multi-directional Airbag)

Figure 3A:
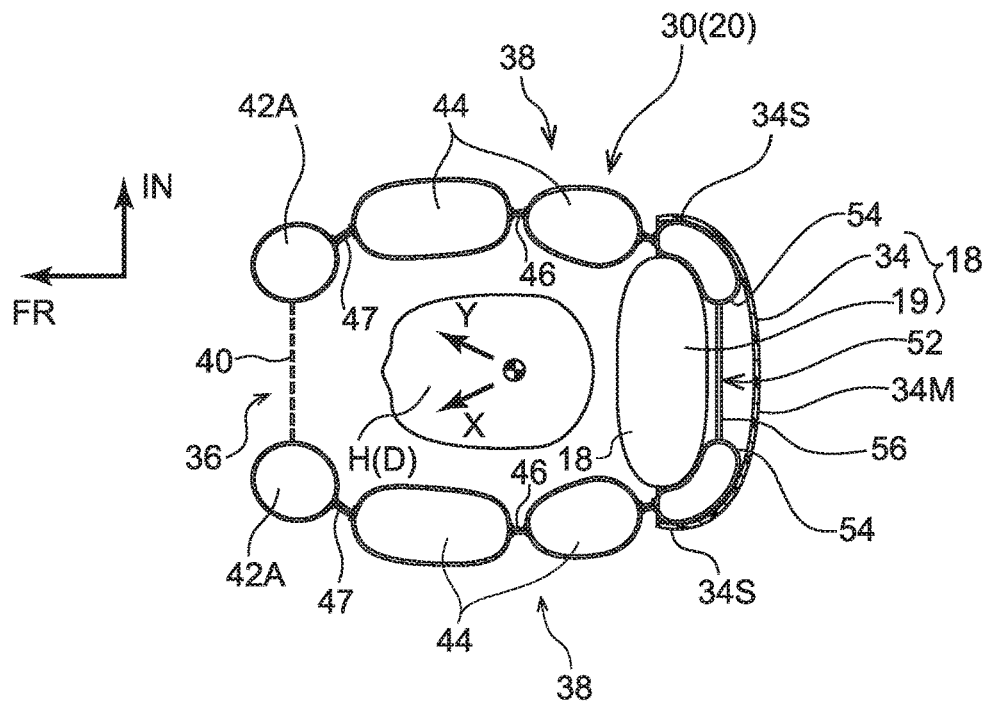
FIG. 3A is a cross-sectional view taken along a line 3A-3A in FIG. 1, showing an inflated and deployed state of a multi-directional airbag that forms part of the vehicle occupant protection device according to the first exemplary embodiment.
Figure 3B:
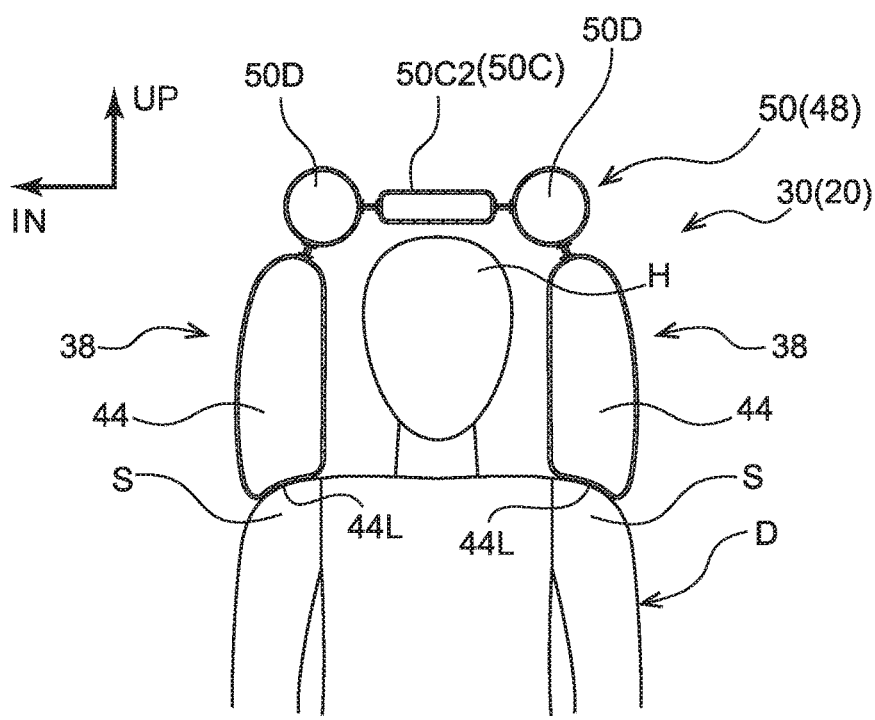
FIG. 3B is a cross-sectional view taken along a line 3B-3B in FIG. 1, showing an inflated and deployed state of a multi-directional airbag that forms part of the vehicle occupant protection device according to the first exemplary embodiment.

As is shown in the planar cross-sectional view in FIG. 3A, the multi-directional airbag 30 is constructed as a single integrated bag body that is inflated and deployed so as to cover the head portion H of the seated person D (hereinafter, this will usually be referred to simply as the 'head portion H') from the front and from both the left and right sides thereof. More specifically, as is shown in FIG. 1 through FIG. 3A, and FIG. 3B, the multi-directional airbag 30 is formed so as to include a forward-deploying portion 36 that is deployed at the front of the head portion H, and a pair of side-deploying portions 38 that are deployed at both the left and right sides of the head portion H.

The forward-deploying portion 36 is formed so as to include a mesh portion 40 that serves as a visible structure which is deployed at the front surface of the head portion H, and a forward-inflating portion 42 that is inflated and deployed so as to surround the mesh portion 40 when seen in a front view. The mesh portion 40 is formed substantially in a rectangular shape when seen in a front view, and the forward-inflating portion 42 is formed substantially in a rectangular frame shape whose inner circumferential edge portions are joined to the mesh portion 40. The forward-inflating portion 42 is inflated and deployed when it is supplied with gas.

As is shown in FIG. 2, a portion of the forward-inflating portion 42 that surrounds the mesh portion 40 mainly above the seat back 16 is formed as a first inflating portion 42A that is inflated and deployed at the front of the head portion H. Moreover, a portion of the forward-inflating portion 42 that is located underneath the first inflating portion 42A (i.e., that overlaps the seat back 16 when seen in a front view) is formed as a second inflating portion 42B that is inflated and deployed at the front of the breast portion B and the shoulder portion S of the seated person D. The second inflating portion 42B is supplied with gas via the first inflating portion 42A. Note that, in the first exemplary embodiment, a portion of the first inflating portion 42A that is located underneath the mesh portion 40 is separated by a seam 42S from other portions of the first inflating portion 42A, and is supplied with gas via the second inflating portion 42B. Moreover, a sub-bag 64 is provided in a lower portion of the second inflating portion 42B of the forward-inflating portion 42. The sub-bag 64 will be described below.

As is shown in FIG. 1, the side-deploying portions 38 are each formed so as to include a side-inflating portion 44 that, upon being supplied with gas, is inflated and deployed at a side of the head portion H, and a seam portion 46 that extends in an up-down direction and serves as a non-inflating portion that divides the side-inflating portion 44 into front and rear portions. The side-inflating portions 44 are large enough (in surface area) to overlap the entire head portion H when seen in a side view, and the seam portion 46 divides side-inflating portion 44 into front and rear portions in the portion of the side-inflating portion 44 that overlaps with the head portion H.

A front end of each of the left and right side-inflating portions 44 is connected to a lower end of the first inflating portion 42A (i.e., in the vicinity of the boundary thereof with the second inflating portion 42B) of the forward-inflating portion 42 so as to be in a state of communication therewith. As a consequence, the left and right side-inflating portions 44 are inflated and deployed when they are supplied with gas from the inflator 32 via the forward-inflating portion 42. On the other hand, an upper portion of the aforementioned communicating portion between the first inflating portion of the forward-inflating portion 42 and each side-inflating portion 44 is partitioned by a seam portion 47 serving as a non-inflating portion.

When the multi-directional airbag 30 is in an inflated and deployed state, a lower end 44L of each side-inflating portion 44 of the left and right side-deploying portions 38 is in contact with the top of a shoulder portion S of the seated person D. In this structure, the position in the up-down direction of the multi-directional airbag 30, when this is in an inflated and deployed state, relative to the (head portion H of the) seated person is determined as a result of this contact with the shoulder portions S by the lower ends 44L of the side-inflating portions 44.

In this structure, when the multi-directional airbag 30 has been positioned in this way, none of the forward-deploying portion 36, the left and right side-deploying portions 38, and an upward-deploying portion 48 (described below) is in contact with the head portion H of a seated person D (i.e., a gap is formed between them) when this person is in a normal seated posture.

The multi-directional airbag 30 also has an upward-deploying portion 48 that is joined to the respective upper edges of the forward-deploying portion 36 and the left and right side-deploying portions 38, and is deployed upwards relative to the head portion H of the seated person D. An upward-inflating portion 50 that is inflated and deployed upon being supplied with gas is formed as a principal portion of the upward-deploying portion 48. The upward-inflating portion 50 is formed so as to include a central-inflating portion 50C that is inflated and deployed above the head portion H, and a pair of upper duct portions 50D that serve as duct portions and extend in the front-rear direction on the left and the right of the central-inflating portion 50C.

As is shown in the flat pattern in FIG. 5, the central-inflating portion 50C includes an inflating portion 50C1 that forms an upper edge of the forward-inflating portion 42, and an inflating portion 50C2 that is separated from the inflating portion 50C1 by seam portions 50S1. The inflating portion 50C2 is also divided into front and rear portions by seam portions 50S2. Both left and right ends of the inflating portion 50C1 are in communication with the upper duct portions 50D, and a central portion in the seat transverse direction of a rear edge of the inflating portion 50C1 is in communication with the inflating portion 50C2. Front ends of the left and right upper ducts 50D are in communication with both the left and right side edges of an upper end of the forward-inflating portion 42.

The multi-directional airbag 30 has a rearward-deploying portion 52 that is deployed at the rear of the upward-deploying portion 48. The rearward-deploying portion 52 is formed so as to include rear duct portions 54, which are inflating portions, and a non-inflating portion 56. The rear duct portions 54 are separated into left and right portions, and upper ends of each of these left and right portions are connected to the corresponding left and right upper duct portion 50D so as to be in a state of communication therewith. The left and right rear duct portions 54 are joined to each other via the non-inflating portion 56 whose front edge is joined to a rear edge of the central-inflating portion 50C.

Moreover, the left and right rear duct portions 54 merge together underneath (i.e., on the right side in FIG. 5) the non-inflating portion 56 so as to form a gas introduction portion 54G This gas introduction portion 54G is connected via a T-shaped diffuser 55 to the inflator 32 so as to be able to receive a gas supply therefrom (see an arrow G). Note that the present invention is not limited to having a structure that employs the diffuser 55, and it is also possible, for example, to insert a portion of a vertically aligned inflator 32 that includes a gas injection port into the gas introduction portion 54G It is also possible to form the gas introduction portion 54G by bending it in an L shape, and to insert a portion of a horizontally aligned inflator 32 that includes a gas injection port into this gas introduction portion 54G.

The rearward-deploying portion 52 described above can be separated into a base portion 52A that is inflated and deployed at the rear of the headrest 18, and a joining portion 52B that is inflated and deployed above the headrest 18. The base portion 52A is supported at its bottom end by the seat back 16 via the inflator 32 and the diffuser 55, while the joining portion 52B connects the base portion 52A to the upward-deploying portion 48 such that these are in a state of communication with each other.

As is shown in FIG. 1, the multi-directional airbag 30 in a non-restraining inflated and deployed state in which it is not restraining the seated person D is formed such that it does not overlap, when seen in a side view, with the side airbag 22B when this is in a non-restraining inflated and deployed state in which it is not restraining the seated person D. In other words, a structure is created in which, when both the multi-directional airbag 30 and the side airbag 22B are in non-restraining inflated and deployed states, there are no inflated and deployed portions of either that overlap with the other when seen at least in a side view. Moreover, as is shown in FIG. 2, a structure is created in which the multi-directional airbag 30 in a non-restraining inflated and deployed state is formed such that it does not overlap, when seen in a front view as well, with the side airbag 22B when this is in a non-restraining inflated and deployed state in which it is not restraining the seated person D.

Prior to being folded, the multi-directional airbag 30, which is inflated and deployed as has been described above, has a deployment configuration (i.e., a flat pattern) such as that shown in FIG. 5. The multi-directional airbag 30 in this deployment configuration is formed as an integrated bag body by an OPW (One Piece Woven). Note that it is also possible to form the multi-directional airbag 30 as an integrated bag body by cutting and sewing peripheral edges of two pieces of woven cloth.

(Sub-bag Portion)

Figure 6A:
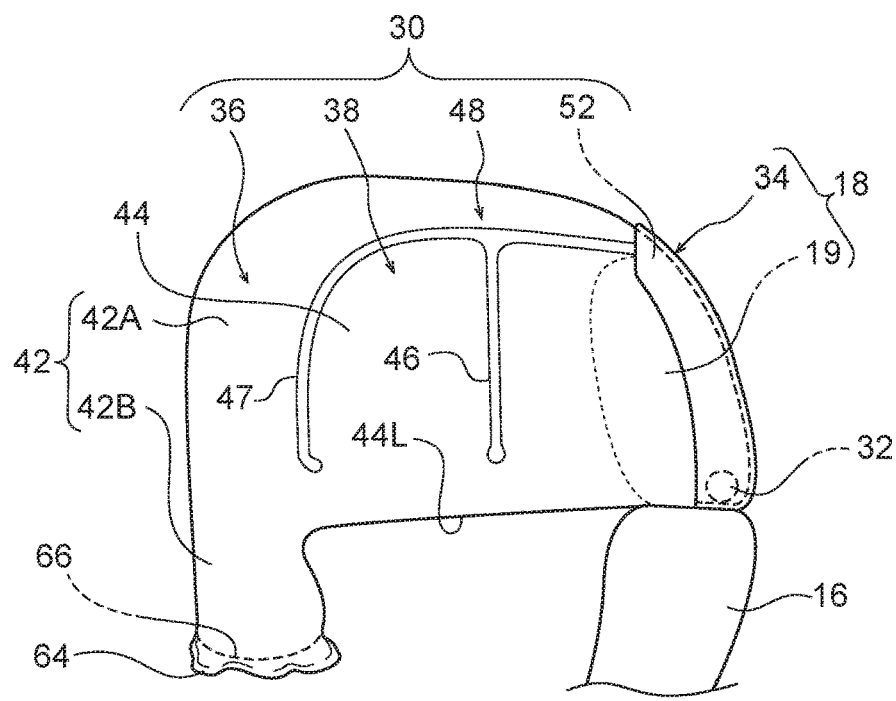
FIG. 6A is a side view schematically showing an inflation and deployment process of a sub-bag portion according to the first exemplary embodiment, with a state prior to the inflation and deployment of the sub-bag portion being shown.

Next, the sub-bag portion 64 which is principal element of the present embodiment will be described. As is shown in FIG. 1 and FIG. 2, the sub-bag portion 64 of the present exemplary embodiment is provided in a lower portion of the forward-inflating portion 42. Specifically, the sub-bag portion 64 is provided at a lower end portion of the second inflating portion 42B, and a tear seam 66 is sewn in a boundary between the sub-bag portion 64 and the second inflating portion 42B. Because of this, as is shown in FIG. 6A, even when the inflation and deployment of the multi-directional airbag 30 has been completed, because the tear seam 66 is sewn in the boundary between the sub-bag portion 64 and the second inflating portion 42B, gas does not flow from the second inflating portion 42B into the sub-bag portion 64.

Figure 6B:
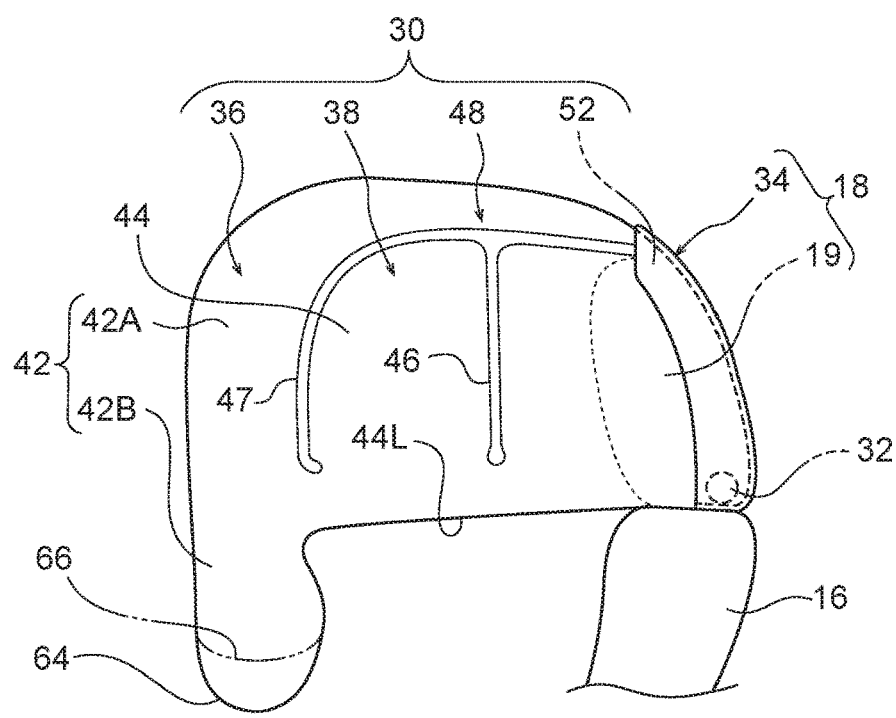
FIG. 6B is a side view schematically showing an inflation and deployment process of a sub-bag portion according to the first exemplary embodiment, with a state after the completion of the inflation and deployment of the sub-bag portion being shown.

Here, the tear seam 66 is formed such that it ruptures when the internal pressure inside the multi-directional airbag 30 reaches a predetermined value or more. As is shown in FIG. 6B, as a result of the tear seam 66 rupturing, the internal space inside the multi-directional airbag 30 and the internal space inside the sub-bag 64 are placed in communication with each other, and gas flows from the second inflating portion 42B into the sub-bag portion 64. Note that, in the second exemplary embodiment, a structure is employed in which the tear seam 66 is ruptured at the point when the internal pressure inside the multi-directional airbag 30 becomes greater than an internal pressure that enables the seated person D to be properly restrained in the event of a collision.

As is shown in FIG. 1, when the sub-bag 64 is inflated and deployed, the range where the seated person D is restrained on the seat front side is expanded towards the bottom of the seat, and the seated person D can be restrained even lower down. Moreover, as a result of gas flowing from the multidirectional airbag 30 to the sub-bag portion 64, the internal pressure inside the multi-directional airbag 30 is reduced.

(Inflator)

A combustion-type or cold gas-type of inflator is employed as the inflator 32, and the gas that is generated as a result of the inflator 32 being operated is supplied to the interior of the multi-directional airbag 30. In the present exemplary embodiment, the inflator 32 is a cylinder-type of inflator, and is disposed such that a longitudinal direction thereof extends in the seat transverse direction inside the module case 34. The inflator 32 is provided with a plurality of gas-generating portions and, in the present exemplary embodiment, is provided with a first gas-generating portion 32A and a second gas-generating portion 32B.

Figure 7:
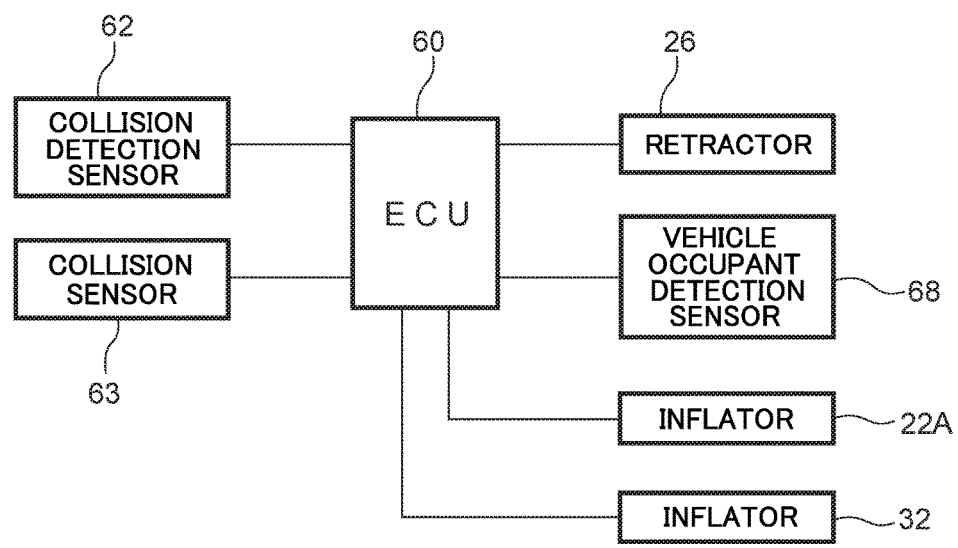
FIG. 7 is a block diagram showing an example of the vehicle occupant protection device according to the first exemplary embodiment.

The first gas-generating portion 32a and the second gas-generating portion 32B are partitioned from each inside the inflator 32, and are formed as what are known as 'dual inflators' which are able to generate gas at mutually independent timings. As is shown in FIG. 7, operations of this inflator 32 are controlled by the ECU 60 which is serving as a control device. Because of this, a structure is created in which it is possible to choose between a case in which only one out of the first gas-generating portion 32A and the second gas-generating portion 32B is operated, and a case in which both the first gas-generating portion 32A and the second gas-generating portion 32B are operated using signals from the ECU 60.

(Module Case)

As is shown in FIG. 1, the headrest 18 is formed so as to include the headrest main body 19, and the module case 34 which is disposed on the seat rear side of the headrest main body 19. The headrest main body 19 forms a front portion of the headrest 18, and is disposed on the seat rear side of the head portion H of the seated person D. Moreover, the headrest main body 19 is attached to the seat back 16 via headrest stays.

The module case 34 which is disposed on the seat rear side of the headrest main body 19 is in the form of a backboard that forms part of the (rear portion design of the) headrest 18. Accordingly, the multi-directional airbag 30 is housed in the rear portion of the headrest 18.

When seen in a front view, the module case 34 protrudes upwards from an upper end of the headrest main body 19, and also projects outwards on both sides in the seat transverse direction from the headrest main body 19. Namely, the module case 34 covers the headrest main body 19 from the rear. In the present exemplary embodiment, the module case 34 covers the rear portion of the headrest main body 19 from above and from both the left and right sides and, as is described above, forms part of the rear portion design of the headrest 18.

More specifically, the main components used to form the module case 34 are a base portion 34B, a main wall 34M that serves as a rear wall, and a pair of left and right side walls 34S. The base portion 34B is in contact with the upper end of the seat back 16.

The wall portion 34M extends upwards from a rear end of the base portion 34B, and is tilted such that an upper end thereof is positioned to the front of the lower end thereof. In addition, when seen in a side view, the wall portion 34M is formed in a curved shape that protrudes rearwards and upwards. Moreover, when seen in a front view, the wall portion 34M protrudes upwards above the upper end of the headrest main body 19, and also projects outwards on both sides in the seat transverse direction from the headrest main body 19.

A space that houses the multi-directional airbag 30 when this is in a folded state is formed between the main wall 34M and the headrest main body 19. In addition, the upper end of the main wall 34M extends above the headrest 18. A structure is thus created in which, during an inflation and deployment procedure, the multi-directional airbag 30 passes between the upper end portion of the main wall 34M and the headrest main body 19. The rearward-deploying portion 52 is able to pass between the upper end portion of the main wall 34M and the headrest main body 19 in the multi-directional airbag 30 when this is in an inflated and deployed state.

The pair of side walls 34S extend forwards from both ends in the seat transverse direction of the main wall 34M, and cover the rear portion of the headrest main body 19 when seen in a side view. Moreover, as is shown in FIG. 3A, a structure is created in which the side-deploying portions 38 (i.e. the portion thereof adjacent to the boundary with the rearward-deploying portion 52) of the multi-directional airbag 30 when this is in an inflated and deployed state pass between the pair of side walls 34S and the headrest main body 19.

The module case 34 described above houses the multi-directional airbag 30, when this is in a folded state, between itself and the headrest main body 19. Moreover, the inflator 32 is fastened by stud bolts together with the multi-directional airbag 30 and the base portion 34B of the multi-directional airbag 30 to a seat back frame.

Here, the multi-directional airbag 30 is folded in an outward roll-fold before being housed in the module case 34. An outward roll-fold refers to a method of roll-folding in which the multi-directional airbag 30 is folded starting from the front end side thereof towards the upper side and the rearward side, so that it ends up being folded in the opposite direction to the deployment direction. In other words, an outward roll-fold is a method of folding that causes a roll-folding portion 30R to be positioned on the outer side (i.e., on the opposite side from the head portion H side) after a deployment process of the multi-directional airbag 30. In the multi-directional airbag 30 in which, as is described above, the side-deploying portions 38 are sewn to the upward-deploying portion 48 and the rearward-deploying portion 52, the side-deploying portions 38 are already folded inside the roll by the time the forward-deploying portion 36 and the upward-deploying portion 48 are folded in an outward roll-fold.

Figure 4A:
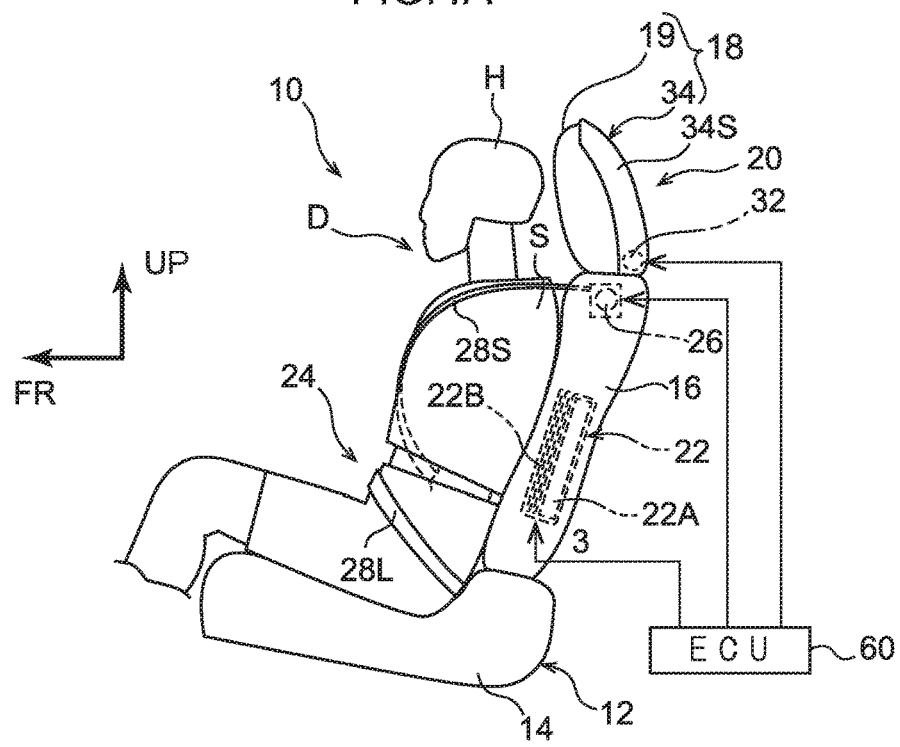
FIG. 4A is a side view showing a schematic overall structure prior to operation of the vehicle occupant protection device according to the first exemplary embodiment.
Figure 4B:
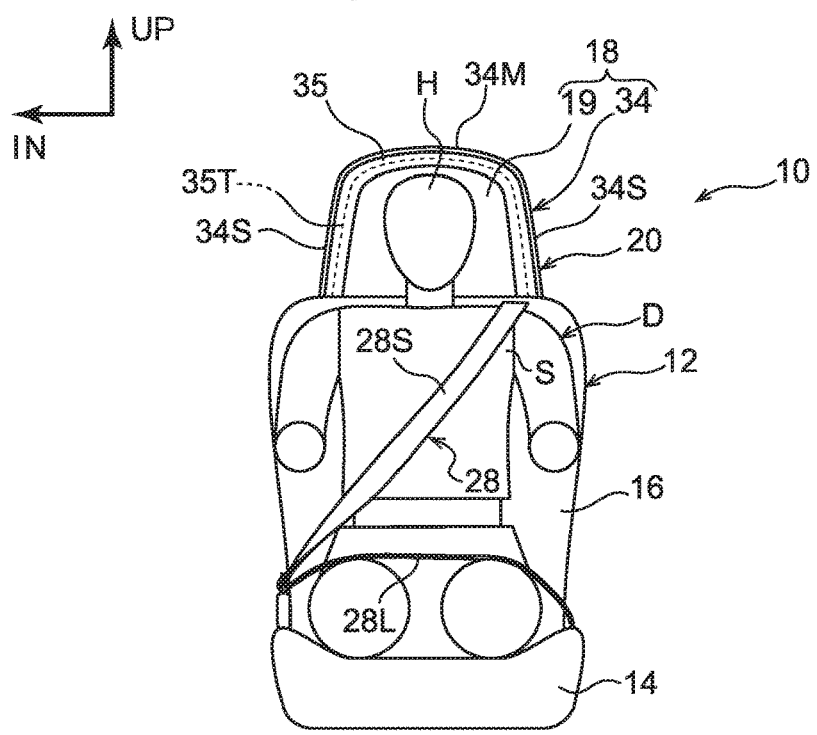
FIG. 4B is a front view showing a schematic overall structure prior to operation of the vehicle occupant protection device according to the first exemplary embodiment.

Here, as is shown in FIG. 4B, the space between the module case 34 and the headrest main body 19 is closed off by an airbag door 35. A structure is created in which, triggered by a tear line 35T which is a weakened portion, the airbag door 35 is split open by inflation pressure from the multi-directional airbag 30 so that the multi-directional airbag 30 is allowed to inflate and deploy towards the front.

(ECU Structure)

As is shown in FIG. 4A, the multi-directional airbag device 20, the side airbag device 22, and the seatbelt device 24 that form part of the vehicle occupant protection device 10 are controlled by the ECU 60 serving as a control device. Specifically, as is shown in FIG. 7, the ECU 60 is electrically connected to the inflator 32 of the multi-directional airbag device 20 and to the inflator 22A of the side airbag device 22. The ECU is also electrically connected to the retractor 26 of the seatbelt device 24. Furthermore, the ECU 60 is also electrically connected to a collision prediction sensor 62 such as a pre-crash sensor and to a collision sensor 63 (or group of sensors). In addition to these, the ECU 60 is also electrically connected to a vehicle occupant detection sensor

68 that detects the height of the head portion H of a seated person D who is sitting in the vehicle seat 12. A sensor that detects the height of the head portion H of the seated person D using, for example, an optical camera can be used for the vehicle occupant detection sensor 68. It is also possible to employ a sensor that intermittently detects the height of the head portion H by detecting the shoulder portion S or the like of a seated person D, or a sensor that is capable of detecting both the head portion H and the shoulder portion S.

Based on signals from the collision prediction sensor 62, the ECU 60 is able to predict for each one of the collision types described below whether or not various types of frontal collision are about to occur or are unavoidable for the vehicle in which that ECU 60 is mounted. Moreover, based on signals from the collision prediction sensor 62, the ECU 60 is able to predict whether or not a side collision is about to occur or is unavoidable for the vehicle in which that ECU 60 is mounted.

When the ECU 60 has predicted a frontal collision based on a signal from the collision prediction sensor 62, or has detected a frontal collision based on a signal from the collision sensor 63, it causes the pretensioner to be operated prior to causing the multi-directional airbag 30 to be inflated and deployed. As a result, tension is imparted to the belt 28 and the seated person D is restrained against the seat back 16. Next, the ECU 60 causes the inflator 32 to be operated. As a result, the multi-directional airbag 30 is inflated and deployed towards the seat front. Note that the types of frontal collision that cause the ECU 60 to operate the inflator 32 include full-wrap frontal collisions and offset frontal collisions and the like.

Here, when the inflator 32 is being operated, the conditions for generating gas are decided in accordance with the height of the head portion H of the seated person D detected by the vehicle occupant detection sensor 68. Specifically, the ECU 60 detects the height of the head portion H of the seated person D based on signals output previously from the vehicle occupant detection sensor 68. If the height of the head portion H of the seated person D is higher than a predetermined height, then only the first gas-generating portion 32A is operated so as to supply gas to the multi-directional airbag 30 from the first gas-generating portion 32A. If, on the other hand, the height of the head portion H of the seated person D is lower than a predetermined height, then both the first gas-generating portion 32A and the second gas-generating portion 32B are operated, and gas is supplied to the multi-directional airbag 30 from both the first gas-generating portion 32A and the second gas-generating portion 32B. Because of this, if the height of the head portion H of the seated person D as detected by the vehicle occupant detection sensor 68 is lower than a predetermined height, then a greater quantity of gas is supplied from the inflator 32 to the multi-directional airbag 30 than when the height of the head portion H is higher than a predetermined height.

Moreover, when the ECU detects, based on a signal from the collision prediction sensor 62, that a frontal collision will occur in a position at the front of the vehicle that is offset by a predetermined value or greater to one side on the vehicle transverse direction, or detects a frontal collision based on a signal from the collision detection sensor 63, it causes the pretensioner to be operated prior to causing the multi-directional airbag 30 and the side airbag 22B to be inflated and deployed. As a result, tension is imparted to the belt 28 and the seated person D is restrained against the seat back 16. Next, the ECU 60 causes the inflator 22A and the inflator 32 to be operated. As a result, the multi-directional airbag 30 is inflated and deployed towards the seat front, and the side airbag 22B is inflated and deployed on the outer side in the vehicle transverse direction of the seated person D (see FIG. 2). Diagonal collisions and minimal-wrap collisions and the like are included among these frontal collisions in positions that are offset by a predetermined value or greater to one side on the vehicle transverse direction. Note that, as is described above, the quantity of gas that is supplied to the multi-directional airbag 30 from the inflator 32 is determined in accordance with the height of the head portion H of the seated person D as detected by the vehicle occupant detection sensor 68.

Here, a diagonal collision (also known as an MDB collision or an oblique collision) is regarded as a collision from a diagonally forward direction (as an example, a collision in which the relative angle between the two vehicles is 15°, and the wrap amount in the vehicle transverse direction is approximately 35%) as stipulated in, for example, NHTSA. In the present exemplary embodiment, as an example, a diagonal collision at a relative speed of 90 km/hr is assumed. Moreover, a minimal wrap collision is regarded as a type of vehicle frontal collision in which, for example, the wrap amount in the vehicle transverse direction relative to the other vehicle in the collision is 25% or less as is stipulated in, for example, IIHS. For example, a collision from an outer side in the vehicle transverse direction against a front side member, which is part of a vehicle body framework, corresponds to a minimal wrap collision. In the present exemplary embodiment, as an example, a minimal wrap collision at a relative speed of 64 km/hr is assumed. Note that NHTSA is an abbreviation of the National Highway Traffic Safety Administration of America. IIHS is an abbreviation of the Insurance Institute for Highway Safety of America.

(Action and Effects)

Next, the action and effects of the present exemplary embodiment will be described.

As is shown in FIG. 1 and FIG. 2, in the vehicle occupant protection device 10 according to the present exemplary embodiment, the sub-bag portion 64 is provided in a lower portion of the second inflating portion 42B of the forward-inflating portion 42. In this structure, when the internal pressure inside the multi-directional airbag 30 reaches a predetermined value or greater, gas flows in from the second inflating portion 42B and inflates the sub-bag portion 64. Here, supplying a large quantity of gas in order to rapidly complete the inflation and deployment of the multi-directional airbag 30 may be considered. In this case, by supplying a large quantity of gas from the inflator 32, the internal pressure inside the multi-directional airbag 30 may increase. If this happens, because gas flows from the multi-directional airbag 30 into the sub-bag portion 64 at the moment when the internal pressure inside the multi-directional airbag 30 reaches a predetermined level or greater, the internal pressure inside the multi-directional airbag 30 does not become too high and this internal pressure can be maintained at the proper level.

Moreover, in the vehicle occupant protection device 10 of the present exemplary embodiment, the tear seam 66 is sewn in the boundary between the multi-directional airbag device 30 and the sub-bag portion 64, and when this tear seam 66 is ruptured, gas is able to flow from the multi-directional airbag 30 into the sub-bag portion 64. In this way, it is possible to prevent the internal pressure inside the multi-directional airbag 30 from becoming too high by means of a simple structure.

Furthermore, as is shown in FIG. 7, the vehicle occupant protection device 10 of the present exemplary embodiment is provided with the vehicle occupant detection sensor 68, and when the sitting height (i.e., the head portion H) of the seated person D which is detected by the vehicle occupant detection sensor 68 is low, then a greater quantity of gas is supplied from the inflator 32 to the multi-directional airbag 30 than when a vehicle occupant having a high sitting height is seated. Here, for example, setting the range of restraint of the seated person D by the multi-directional airbag 30 based on the World SIDE AM 50 may be considered. In this case, if a vehicle occupant whose sitting height is lower than the AM 50 is seated in the vehicle seat 12, then the height of the head portion of this vehicle occupant is lower than the height of the head portion H of the seated person D shown in FIG. 1. Here, in the present exemplary embodiment, by proactively causing the sub-bag portion 64 to inflate and deploy towards the seat lower side when the siting height of the seated person D is low, and broadening the extent of the restraint of the seated person D by the airbag towards the seat lower side, the seated person D is able to be fully restrained. Namely, irrespective of the physique (i.e., the sitting height) of the seated person D, a superior restraining performance can be maintained.

Furthermore, the inflator 32 of the present exemplary embodiment is provided with the first gas-generating portion 32A and the second gas-generating portion 32B. When a vehicle occupant of small stature whose sitting height is low is seated in the vehicle seat 12, gas is supplied from both the first gas-generating portion 32A and the second gas-generating portion 32B to the multi-directional airbag 30. As a consequence, the sub-bag portion 64 can be rapidly inflated and deployed, and the level of protection of a vehicle occupant having a low sitting height can be improved by means of a simple structure.

When, on the other hand, a vehicle occupant having a high sitting height is seated on the vehicle seat 12, gas is only supplied from the first gas-generating portion 32A to the multi-directional airbag 30. As a consequence, the internal pressure inside the multi-directional airbag 30 can be kept at a pressure that enables the vehicle occupant to be properly protected, and the internal pressure inside the multi-directional airbag 30 can also be prevented from becoming too high. Moreover, as is described above, when the internal pressure inside the multi-directional airbag 30 reaches a predetermined value or greater, because gas then flows from the multi-directional airbag 30 to the sub-bag 64, this prevents the internal pressure inside the multi-directional airbag 30 from becoming too high. Accordingly, as is described above, the multi-directional airbag 30 can be deployed swiftly, while, at the same time, the internal pressure inside the multi-directional airbag 30 is kept at an excellent level. In particular, by employing a dual inflator which is provided with a plurality of gas-generating portions, as is the case in the present exemplary embodiment, compared with a structure in which a plurality of inflators are disposed inside the headrest 18, a reduction in the amount of space that is required can be achieved.

Moreover, the multi-directional airbag 30 of the vehicle occupant protection device 10 is housed inside the module case 34 which forms part of the headrest 18. Because of this, compared with a structure in which, for example, a gas supply pipe which is disposed so as to surround the head portion of a vehicle occupant from above protrudes at all times into the vehicle cabin interior, the vehicle occupant protection device 10 has a more attractive appearance prior to being operated while, at the same time, enables an equivalent or better vehicle occupant protection performance to be maintained. Moreover, the vehicle occupant protection device 10 (principally, the multi-directional airbag device 20) in no way obstructs the adjustment of the front-rear position of the vehicle seat 12, or the height adjustment thereof, or the reclining action thereof.

Furthermore, in the multi-directional airbag device 20 forming part of the vehicle occupant protection device 10, as a result of the lower end 44L of the side-inflating portions 44 that form part of the side-deploying portions 38 of the multi-directional airbag 30 being in contact with the top of the shoulder portions S of the seated person D, the position in an up-down direction of the multi-directional airbag 30 relative to the seated person D is determined. As a consequence, irrespective of any individual differences in, for example, the stature or sitting posture of the seated person D, the multi-directional airbag 30 can be inflated and deployed at an appropriate position in the up-down direction. Accordingly, the restraint (i.e., the movement limitation) performance of a vehicle occupant by the multi-directional airbag 30 is improved.

Variant Example of the First Exemplary Embodiment

Note that, in the present exemplary embodiment, the tear seam 66 is sewn between the multi-directional airbag 30 and the sub-bag portion 64, however, the present invention is not limited to this. For example, it is also possible to employ the structure of the variant example shown in FIG. 8.

Figure 8:
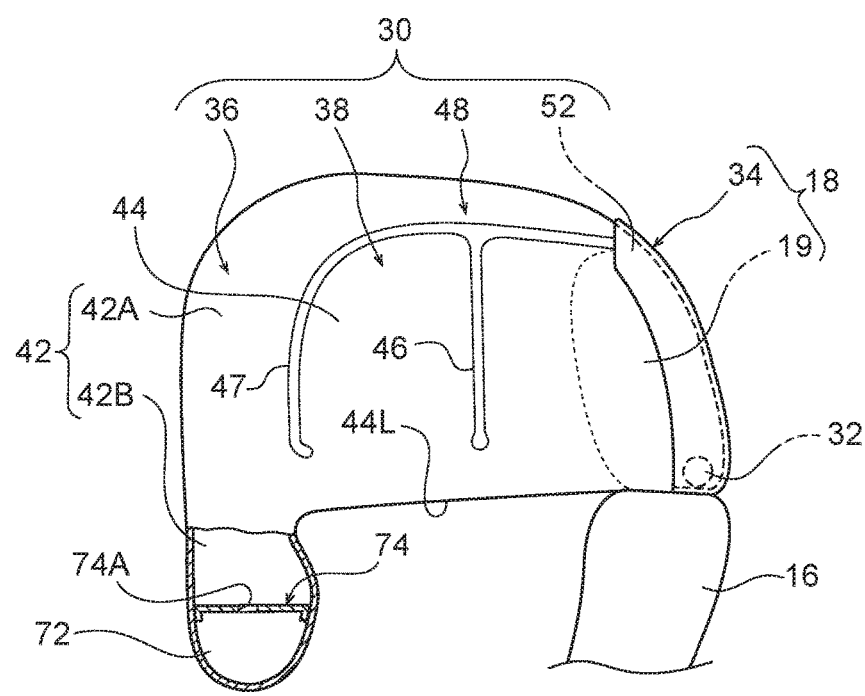
FIG. 8 is a side view schematically showing a variant example of the multi-directional airbag of the vehicle occupant protection device according to the first exemplary embodiment.

As is shown in FIG. 8, a sub-bag portion 72 of the present variant example is formed integrally with a lower portion of the second inflating portion 42B of the forward-inflating portion 42, and the sub-bag portion 72 and the second inflating portion 42b are partitioned from each other by a tether 74.

Here, a communicating hole 74A is formed in the tether 74. In this structure, when the internal pressure inside the multi-directional airbag 30 reaches a predetermined value or greater, gas flows from the second inflating portion 42B into the sub-bag portion 72. As a consequence, the present variant example has the same type of effect as the first exemplary embodiment in which the sub-bag portion 64 and the second inflating portion 42B are partitioned by the tear seam 66.

Note that the size of the communicating hole 74A may be suitably altered in accordance with the internal pressure required in the multi-directional airbag 30. For example, if the size of the communicating hole 74A is made smaller, then it is possible to suppress the gas from flowing into the sub-bag portion 72 until the internal pressure inside the multi-directional airbag increases. If, on the other hand, the size of the communicating hole 74A is made larger, then the gas is allowed to flow swiftly into the sub-bag portion 72 and cause the sub-bag portion to be inflated and deployed.

Second Exemplary Embodiment

Next, a vehicle occupant protection device 80 according to a second exemplary embodiment of the present invention will be described with reference made to the drawings. Note that structure that is the same as in the first exemplary embodiment is given the same descriptive symbol and a description thereof is omitted.

Figure 9:
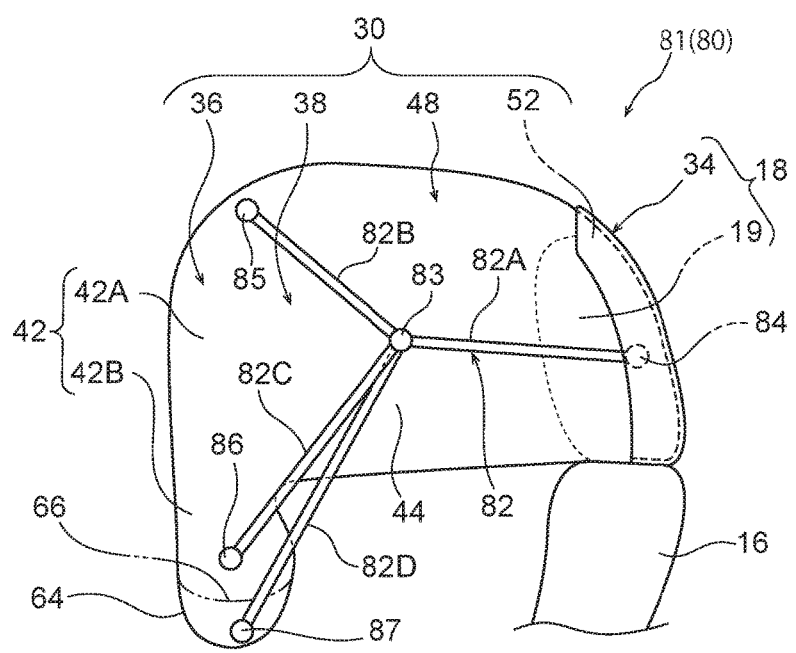
FIG. 9 is a side view schematically showing a multi-directional airbag of a vehicle occupant protection device according to a second exemplary embodiment.

As is shown in FIG. 9, a multi-directional airbag 81 forming part of the vehicle occupant protection device 80 of the present exemplary embodiment differs from the first exemplary embodiment in that a strap 82 is provided. One end of the strap 82 is fixed to the interior of the module case 34 forming part of the headrest 18, while another end thereof is fixed to the first inflating portion 42A and the second inflating portion 42B of the forward-inflating portion 42, and to the sub-bag portion 64.

Specifically, the strap 82 is formed so as to include a plurality of elongated, belt-shaped components, and the strap 82 of the present exemplary embodiment is formed so as to include a first belt-shaped component 82A, a second belt-shaped component 82B, a third belt-shaped component 82C, and a fourth belt-shaped component 82D. The first belt-shaped component 82A extends in the seat front-rear direction, and a rear end portion thereof is fixed via a rear portion fixing point 84 to the interior of the module case 34. A front end portion of the first belt-shaped component 82A is fixed to an intermediate portion fixing point 83 that is set in the side-inflating portions 44.

The second belt-shaped component 82B extends from the intermediate portion fixing point 83 diagonally towards the seat front side and the seat upper side, and a rear end portion thereof is fixed to the intermediate portion fixing point 83. A front end portion of the second belt-shaped component 82B is fixed to a front portion first fixing point 85 that is set in the upper end portion of the first inflating portion 42A of the forward-inflating portion 42.

The third belt-shaped component 82C extends from the intermediate portion fixing point 83 diagonally towards the seat front side and the seat lower side, and a rear end portion thereof is fixed to the intermediate portion fixing point 83. A front end portion of the third belt-shaped component 82C is fixed to a front portion second fixing point 86 that is set in the lower portion of the second inflating portion 42B of the forward-inflating portion 42.

The fourth belt-shaped component 82D extends from the intermediate portion fixing point 83 diagonally towards the seat front side and the seat lower side, and a rear end portion thereof is fixed to the intermediate portion fixing point 83. A front end portion of the fourth belt-shaped component 82D is fixed to a front portion third fixing point 87 that is set in the lower portion of the sub-bag portion 64 that is provided in the lower portion of the second inflating portion 42B.

Here, the second belt-shaped component 82B and the third belt-shaped component 82C pull the forward-inflating portion 42 towards the seat rearward side in conjunction with the inflation and deployment of the forward-inflating portion 42. In contrast, the fourth belt-shaped component 82D is constructed such that it pulls the sub-bag portion 64 towards the seat rearward side in conjunction with the inflation and deployment of the sub-bag portion 64. Because of this, the intermediate portion fixing point 83 to which the rear end of the third belt-shaped portion 82C and the rear end of the fourth belt-shaped portion 82D are fixed are positioned on the seat upper side of the front portion second fixing point 86 and the front portion third fixing point 87.

In FIG. 9, only the strap 82 on the seat left side of the multi-directional airbag 30 is shown, however, a strap is provided in the same way on the seat right side as well of the multi-directional airbag 30. Because of this, in the present exemplary embodiment, a pair of left and right straps 82 are provided for the multi-directional airbag 30, and front end portions of the respective straps 82 are fixed to both end portions in the seat transverse direction of the sub-bag portion 64.

(Action and Effects)

Next, the action and effects of the present exemplary embodiment will be described.

In the present exemplary embodiment, when the sub-bag 64 is in an inflated and deployed state, tensile force towards the seat rear side is made to act on the sub-bag portion 64 by the strap 82. As a consequence, even if the seated person D makes an inertial movement towards the seat front side because of a vehicle collision or the like, the upper body of the seated person D can be properly restrained by the sub-bag portion 64. Namely, compared with a structure in which the strap 82 is not provided, it is possible to improve the capability of the sub-bag portion 64 to restrain the seated person D. In particular, in the present exemplary embodiment, the front end portion of the fourth belt-shaped component 82D is fixed to the front portion third fixing point 87 which is set in a lower portion of the sub-bag portion 64. As a consequence, compared with a structure in which the front end portion of the fourth belt-shaped component 82D is fixed to the upper portion of the sub-bag portion 64, it is possible to prevent the lower portion of the sub-bag portion 64 from sliding towards the seat front side when it comes into contact with the seated person D. Namely, it is possible to improve the restraining capability of the lower portion of the sub-bag portion 64.

Moreover, in the present exemplary embodiment, because the pair of left and right straps 82 are provided in the multi-directional airbag 30, both end portions in the seat transverse direction of the sub-bag portion 64 are pulled towards the seat rear side by this pair of straps 82. As a consequence, compared, for example, with a structure in which the strap 82 is fixed only to an intermediate portion in the seat transverse direction of the sub-bag portion 64, it is possible to improve the capability of the sub-bag portion 64 to restrain the seated person D.

Furthermore, in the present exemplary embodiment, the rear end portion of the fourth belt-shaped component 82D which is fixed to the sub-bag portion 64 is fixed to the intermediate portion fixed portion 83 which is set between the one end and the other end of the strap 82, and this intermediate portion fixing point 83 is positioned on the seat upper side of the third fixing point 87. As a consequence, compared with when the intermediate portion fixing point 83 is not provided, it is possible to shorten the lengths of the respective belt-shaped components forming the strap 82, so that the strap 82 can be deployed smoothly. Moreover, the sub-bag portion 64 is pulled diagonally towards the seat rear side and the seat upper side. As a consequence, the upper body of the seated person D which has tilted forwards due to a collision or the like can be supported from the seat lower side.

Furthermore, in the present exemplary embodiment, the rear end portion of the strap 82 (i.e., the rear end portion of the first belt-shaped component 82A) is fixed to the interior of the module case 34 via a rear portion fixing point 84. As a consequence, because there is no change in the position of the rear end of the strap 82 before and after the inflation and deployment of the multi-directional airbag 30, the sub-bag portion 64 can be pulled with stability towards the seat rear side. Namely, compared with a structure in which the rear end of the strap 82 is fixed to the multi-directional airbag 30 or the like, a superior protection performance for the seated person D can be maintained.

Variant Example of the Second Exemplary Embodiment

Note that, in the present exemplary embodiment, the rear end portion of the fourth belt-shaped component 82D is fixed to the intermediate portion fixing point 83, however, the present invention is not limited to this. For example, as in the variant example shown in FIG. 10, it is also possible to employ a structure in which a fifth belt-shaped component 82E is provided instead of the fourth belt-shaped component 82D.

Figure 10:
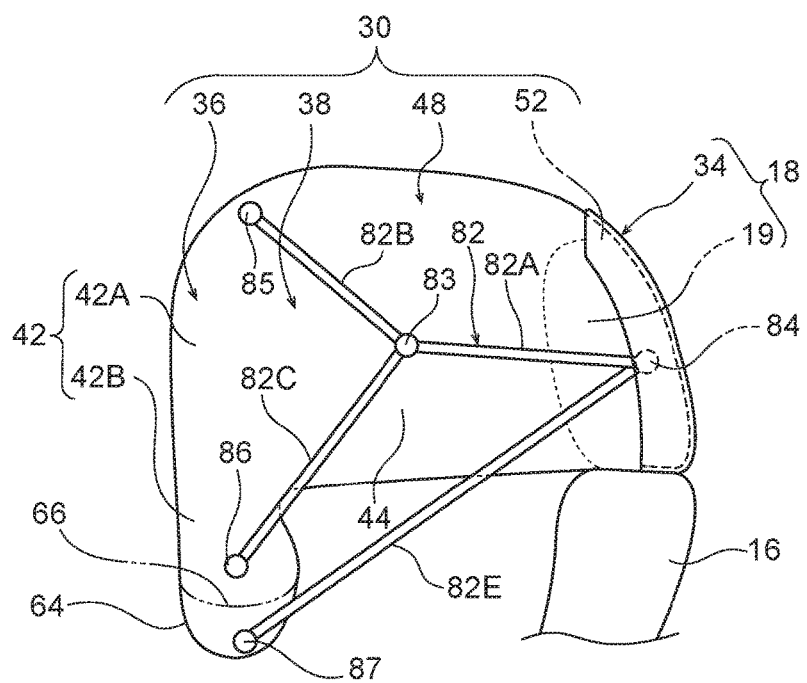
FIG. 10 is a side view schematically showing a third variant example of the vehicle occupant protection device according to the second exemplary embodiment.

As is shown in FIG. 10, the strap 82 of the present variant example, is formed so as to include the first belt-shaped component 82A, the second belt-shaped component 82B, the third belt-shaped component 82C, and the fifth belt-shaped component 82E. Here, the first belt-shaped component 82A, the second belt-shaped component 82B, and the third belt-shaped component 82C have the same structure as in the second exemplary embodiment.

The fifth belt-shaped component 82E extends from the headrest 18 diagonally towards the seat front side and the seat lower side, and a rear end portion thereof is fixed to the rear portion fixing point 84 which is set inside the module case 34. A front end portion of the fifth belt-shaped component 82E is fixed to the front portion third fixing point 87 that is set in the lower portion of the sub-bag portion 64 that is provided in the lower portion of the second inflating portion 42B.

In the present variant example, the fifth belt-shaped component 82E is fixed to the sub-bag portion 64 without passing through the intermediate portion fixing point 83. As a consequence, the sub-bag portion 64 can be pulled towards the seat rear side by a predetermined tensile force irrespective of the position of the intermediate portion fixing point 83.

Additional Examples

A first exemplary embodiment and a second exemplary embodiment of the present invention have been described above, however, the present invention is not limited to the above-described structures and it should be understood that the present invention may be implemented in a variety of aspects in addition to the above-described structures insofar as they do not depart from the spirit or scope of the present invention. For example, in the above-described exemplary embodiments and variant examples thereof, the sub-bag portion 64 is provided in a lower portion of the second inflating portion 42B forming part of the forward-inflating portion 42, however, the present invention is not limited to this, and it is also possible to employ a structure in which sub-bag portions are provided in the side-inflating portions 44. Alternatively, it is also possible to employ a structure in which sub-bag portions are provided in both the forward-inflating portion 42 and the side-inflating portions 44. If sub-bag portions are provided in the lower portion of each one of the pair of left and right side-inflating portions 44, then a tear seam or the like may be sewn in the boundary between each side-inflating portion 44 and the sub-bag portion. In this case, when the tear seam is ruptured, gas flows from the side-inflating portions 44 into the sub-bag portions, and the sub-bag portions are inflated and deployed towards the seat lower side. As a consequence, it is possible to improve the restraining performance for the shoulder portion S of the seated person D.

Moreover, in the above-described exemplary embodiments and variant examples thereof, a structure is employed in which the inflator 32 is provided with the first gas-generating portion 32A and the second gas-generating portion 32B, however, the present invention is not limited to this. For example, if sufficient space can be secured for a plurality of inflators to be installed inside the headrest 18, then it is also possible for two inflators to be installed. In this case, one inflator becomes the 'first gas-generating portion' and the other inflator becomes the 'second gas-generating portion'. Furthermore, it is also possible to employ a structure in which three or more gas-generating portions are provided. In this case, if the height of the head portion H of the seated person D, as detected by the vehicle occupant detection sensor 68, is higher than a predetermined height, then gas can be supplied to the multi-directional airbag 30 from one gas-generating portion out of the three or more gas-generating portions. If, on the other hand, the height of the head portion H of the seated person D, as detected by the vehicle occupant detection sensor 68, is lower than a predetermined height, then gas can be supplied to the multi-directional airbag 30 from all of the three or more gas-generating portions.

Furthermore, it is also possible to employ a structure in which the inflator 32 is only provided with one gas-generating portion. In this case, if an exhaust tube or the like is set up to allow a portion of the gas generated by the inflator 32 to be discharged to the outside of the multi-directional airbag 30, then the same type of effects as in the above-described exemplary embodiments can be obtained. Specifically, if the height of the head portion H of the seated person D, as detected by the vehicle occupant detection sensor 68, is higher than a predetermined height, then a portion of the gas generated from the inflator 32 can be discharged via this exhaust tube. At this time, by generating a quantity of gas that can cause the multi-directional airbag 30 to inflate and deploy even if a portion of the gas is discharged from the exhaust tube, then it is possible to cause only the multi-directional airbag 30 to be inflated and deployed without causing the sub-bag portion 64 to be inflated and deployed. If, on the other hand, the height of the head portion H of the seated person D, as detected by the vehicle occupant detection sensor 68, is lower than a predetermined height, then the exhaust tube can be closed off by a mechanical mechanism or the like so that all of the gas generated from the inflator 32 is supplied to the multi-directional airbag 30. If this type of structure is employed, then a greater quantity of gas can be supplied to the multi-directional airbag 30 in order to cause the sub-bag portion 64 to inflate and deploy when the height of the head portion H of the seated person D is lower than a predetermined height than when the height of the head portion H is higher than a predetermined height.

Furthermore, in the above-described exemplary embodiments and variant examples thereof, a structure in which the vehicle occupant detection sensor 68 is provided is described, however, the present invention is not limited to this, and it is also possible to employ a structure in which the vehicle occupant detection sensor 68 is not provided. In this case, the sub-bag portion 64 is used in order to reduce the pressure inside the multi-directional airbag 30 and prevent the internal pressure inside the multi-directional airbag 30 from becoming too high.

Furthermore, in the second exemplary embodiment, as is shown in FIG. 9, the rear end portion of the strap 82 is fixed to the rear portion fixing point 84 inside the module case 34, however, the present invention is not limited to this. For example, it is also possible to set up a fixing point in the upper portion of the seat back 16, and to fix the rear end portion of the strap 82 to this fixing point. Moreover, it is also possible for the rear end portion of the strap 82 to be fixed further to the seat rear side than the forward-inflating portion 42 of the multi-directional airbag 30. If a structure in which there is no first belt-shaped component 82A is employed, then because the intermediate portion fixing point 83 becomes the rear end of the strap 82, the rear end portion of the strap 82 ends up being fixed further to the seat rear side than the forward-inflating portion 42 of the multi-directional airbag 30.

Furthermore, in the above-described exemplary embodiments and variant examples thereof, an example in which the multi-directional airbag 30 is housed inside the headrest 18 is described, however, the present invention is not limited to this, and it is also possible to employ a structure in which the multi-directional airbag 30 is housed inside a vehicle seat in which the headrest 18 and the seat back 16 are formed as a single integrated body. In this case, the portion of the vehicle seat that supports the head portion of a vehicle occupant corresponds to the 'headrest' of the present invention.

Furthermore, in the above-described exemplary embodiments and variant examples thereof, an example in which the vehicle occupant protection device is provided with the side airbag device 22 is described, however, the present invention is not limited this. For example, it is also possible to employ a structure in which the vehicle occupant protection device is not provided with the side airbag device 22. In a structure in which the vehicle occupant protection device is provided with the side airbag device 22, the present invention is not limited to a structure in which the side airbag device 22 is provided in the vehicle seat 12. For example, it is also possible for the vehicle occupant protection device to be formed having a side airbag device that is provided in a side door or the like. Moreover, an example is also described in which the vehicle occupant protection device is provided with a side airbag device 22 on the outer side in the vehicle transverse direction, however, the present invention is not limited to this. For example, it is also possible to employ a structure in which the vehicle occupant protection device is provided with a side airbag device that is disposed on the center side in the vehicle transverse direction either instead of, or in addition to the side airbag device 22 that is disposed on the outer side in the vehicle transverse direction.

Furthermore, in the above-described exemplary embodiments and variant examples thereof, an example in which the seat transverse direction of the vehicle seat 12 matches the vehicle transverse direction is described, however, the present invention is not limited to this. For example, it is also possible to employ a structure in which the vehicle seat 12 is disposed diagonally relative to the vehicle body, or a structure in which the orientation of the vehicle seat 12 relative to the vehicle body can be altered (i.e., can be rotated around an up-down axis). In this type of structure, a structure that is provided with multi-directional airbag 30 which is inflated and deployed so as to surround the head portion H of a seated person D is able to contribute to the superior protection of this head portion H. Moreover, because the multi-directional airbag 30 prior to inflation and deployment is housed inside the headrest, it is difficult for the multi-directional airbag 30 to interfere with the interior surfaces inside the vehicle cabin or with vehicle structural components, and the multi-directional airbag 30 can be restricted or prevented from obstructing an operation to alter the orientation of the vehicle seat 12 relative to the vehicle body.

Moreover, in the above-described exemplary embodiments and variant examples thereof, an example in which the forward-deploying portion forming part of the multi-directional airbag 30 includes the mesh portion 40 is described, however, the present invention is not limited to this. For example, it is also possible to employ a structure in which a transparent sheet is provided as a visible structure instead of the mesh portion 40, or a structure in which no visible structure is provided.

Furthermore, in the above-described exemplary embodiments and variant examples thereof, an example in which the multi-directional airbag 30 is folded in an outward roll-fold is described, however, the present invention is not limited to this. For example, it is also possible for the multi-directional airbag 30 to be housed inside head rest or seat back 16 or the like in another type of fold such as a bellows-fold or the like.

What is claimed is:

1. A vehicle occupant protection device comprising:
an airbag main body formed as a single integrated bag body configured to cover a head portion of a vehicle occupant, the airbag main body including a forward-inflating portion housed in a headrest or in a seat back of a vehicle seat and configured to inflate and deploy with gas supplied by from a gas-generating portion, the forward-inflating portion being configured to inflate on a seat front side of the head portion, the airbag main body including a pair of left and right side-inflating portions connected to the forward-inflating portion and configured to inflate on seat side portions of the head portion; and
a sub-bag portion provided in at least one of the forward-inflating portion, the left side-inflating portion, or the right side-inflating portion, the sub-bag portion being configured to inflate and deploy towards a seat lower side by receiving an inflow of gas supplied from the at least one of the forward-inflating portion, the left side-inflating portion, or the right side-inflating portion, the sub-bag portion inflating and deploying in response to an internal pressure inside the airbag main body being equal to or greater than a predetermined value.

2. A vehicle occupant protection device comprising:
an airbag main body formed as a single integrated bag body configured to cover a head portion of a vehicle occupant, the airbag main body including a forward-inflating portion housed in a headrest or in a seat back of a vehicle seat and configured to inflate and deploy with gas supplied by a gas-generating portion, the forward-inflating portion being configured to inflate on a seat front side of the head portion, the airbag main body including a pair of left and right side-inflating portions connected to the forward-inflating portion and configured to inflate on seat side portions of the head portion;
a sub-bag portion provided in at least one of the forward-inflating portion, the left side-inflating portion, or the right side-inflating portion, the sub-bag portion being configured to inflate and deploy to a seat lower side in response to receiving an inflow of gas from the at least one of the forward-inflating portion, the left side-inflating portion, or the right side-inflating portion, the sub-bag portion inflating and deploying in response to an internal pressure inside the airbag main body being equal to or greater than a predetermined value; and
a tear seam sewn in a boundary between the airbag main body and the sub-bag portion, the tear seam being configured to rupture in response to the internal pressure inside the airbag main body being equal to the predetermined value or greater.

3. A vehicle occupant protection device comprising:
an airbag main body formed as a single integrated bag body configured to cover a head portion of a vehicle occupant, the airbag main body including a forward-inflating portion housed in a headrest or in a seat back of a vehicle seat and configured to inflate and deploy with gas supplied by a gas-generating portion, the forward-inflating portion being configured to inflate on a seat front side of the head portion, the airbag main body including a pair of left and right side-inflating portions connected to the forward-inflating portion and configured to inflate on seat side portions of the head portion;

a sub-bag portion provided in at least one of the forward-inflating portion, the left side-inflating portion, or the right side-inflating portion, the sub-bag portion being configured to inflate and deploy in response to receiving an inflow of gas from the at least one of the forward-inflating portion, the left side-inflating portion, or the right side-inflating portion, the sub-bag portion inflating and deploying in response to an internal pressure inside the airbag main body being equal to or greater than a predetermined value, wherein:

the sub-bag portion is provided in a lower portion of the at least one of the forward-inflating portion, the left side-inflating portion, or the right side-inflating portion such that the sub-bag portion inflates and deploys on a seat lower side, and when a height of the head portion of the vehicle occupant, as detected by a vehicle occupant detection sensor, is lower than a predetermined height, a greater quantity of gas is supplied from the gas-generating portion to the airbag main body than a quantity of gas supplied when the height of the head portion is higher than the predetermined height.

4. The vehicle occupant protection device according to claim 3, further comprising:

a tear seam sewn in a boundary between the airbag main body and the sub-bag portion, the tear seam being configured to rupture in response to the internal pressure inside the airbag main body being equal to the predetermined value or greater.

5. The vehicle occupant protection device according to claim 4, wherein:

a plurality of the gas-generating portions are provided, upon the height of the head portion, as detected by the vehicle occupant detection sensor, being higher than a predetermined height, the gas is supplied from a portion of the plurality of gas-generating portions to the airbag main body, and upon the height of the head portion, as detected by the vehicle occupant detection sensor, being lower than a predetermined height, the gas is supplied from all of the plurality of gas-generating portions to the airbag main body.

6. The vehicle occupant protection device according to claim 3, wherein:

a plurality of the gas-generating portions are provided, upon the height of the head portion, as detected by the vehicle occupant detection sensor, being higher than the predetermined height, the gas is supplied from a portion of the plurality of gas-generating portions to the airbag main body, and upon the height of the head portion, as detected by the vehicle occupant detection sensor, being lower than the predetermined height, then gas is supplied from all of the plurality of gas-generating portions to the airbag main body.

7. The vehicle occupant protection device according to claim 6, further comprising:

a strap having a first end fixed to one of the headrest, the seat back, or a seat rear side of the airbag main body, the strap having a second end fixed to the sub-bag portion and being configured to pull the sub-bag portion towards the seat rear side in conjunction with the inflation and deployment of the sub-bag portion towards the seat lower side, wherein the sub-bag portion is provided in a lower portion of the forward-inflating portion.

8. The vehicle occupant protection device according to claim 7, wherein a pair of left and right straps are provided, and the second end of each strap is individually fixed to one of two end portions in a seat transverse direction of the sub-bag portion.

9. The vehicle occupant protection device according to claim 3, further comprising:

a strap having a first end fixed to one of the headrest, the seat back, or a seat rear side of the airbag main body, the strap having a second end fixed to the sub-bag portion and being configured to pull the sub-bag portion towards the seat rear side in conjunction with the inflation and deployment of the sub-bag portion towards the seat lower side, wherein the sub-bag portion is provided in a lower portion of the forward-inflating portion.

10. The vehicle occupant protection device according to claim 9, wherein a pair of left and right straps are provided, and the second end of each strap is individually fixed to one of two end portions in a seat transverse direction of the sub-bag portion.

11. The vehicle occupant protection device according to claim 10, wherein the second end of the strap is fixed to a lower portion of the sub-bag portion.

12. The vehicle occupant protection device according to claim 10, wherein the first end of the strap is fixed to the headrest or to the seat back.

13. The vehicle occupant protection device according to claim 10, wherein the first end of the strap is fixed to a position on a seat upper side of the second end of the strap.

14. The vehicle occupant protection device according to claim 13, wherein a portion between the first end and the second end of the strap is fixed to the side-inflating portions.

15. The vehicle occupant protection device according to claim 9, wherein the second end of the strap is fixed to a lower portion of the sub-bag portion.

16. The vehicle occupant protection device according to claim 9, wherein the first end of the strap is fixed to the headrest or to the seat back.

17. The vehicle occupant protection device according to claim 9, wherein the first end of the strap is fixed to a position on a seat upper side of the second end of the strap.

18. The vehicle occupant protection device according to claim 17, wherein a portion between the first end and the second end of the strap is fixed to the side-inflating portions.

19. A vehicle occupant protection device comprising:

an airbag main body formed as a single integrated bag body configured to cover a head portion of a vehicle occupant, the airbag main body including a forward-inflating portion housed in a headrest or in a seat back of a vehicle seat and configured to inflate and deploy with gas supplied by a gas-generating portion, the forward-inflating portion being configured to inflate on a seat front side of the head portion, the airbag main body including a pair of left and right side-inflating portions connected to the forward-inflating portion and configured to inflate on seat side portions of the head portion; and a sub-bag portion provided in at least one of the forward-inflating portion, the left side-inflating portion, or the right side-inflating portion, the sub-bag portion being configured to inflate and deploy in response to receiving an inflow of gas from the at least one of the forward-inflating portion, the left side-inflating portion, or the right side-inflating portion in response to an internal pressure inside the airbag main body being equal to or greater than a predetermined value, wherein before inflating, the sub-bag portion is not in communication with the forward-inflating portion or the side-inflating portions.

* * * * *